Figure 1:
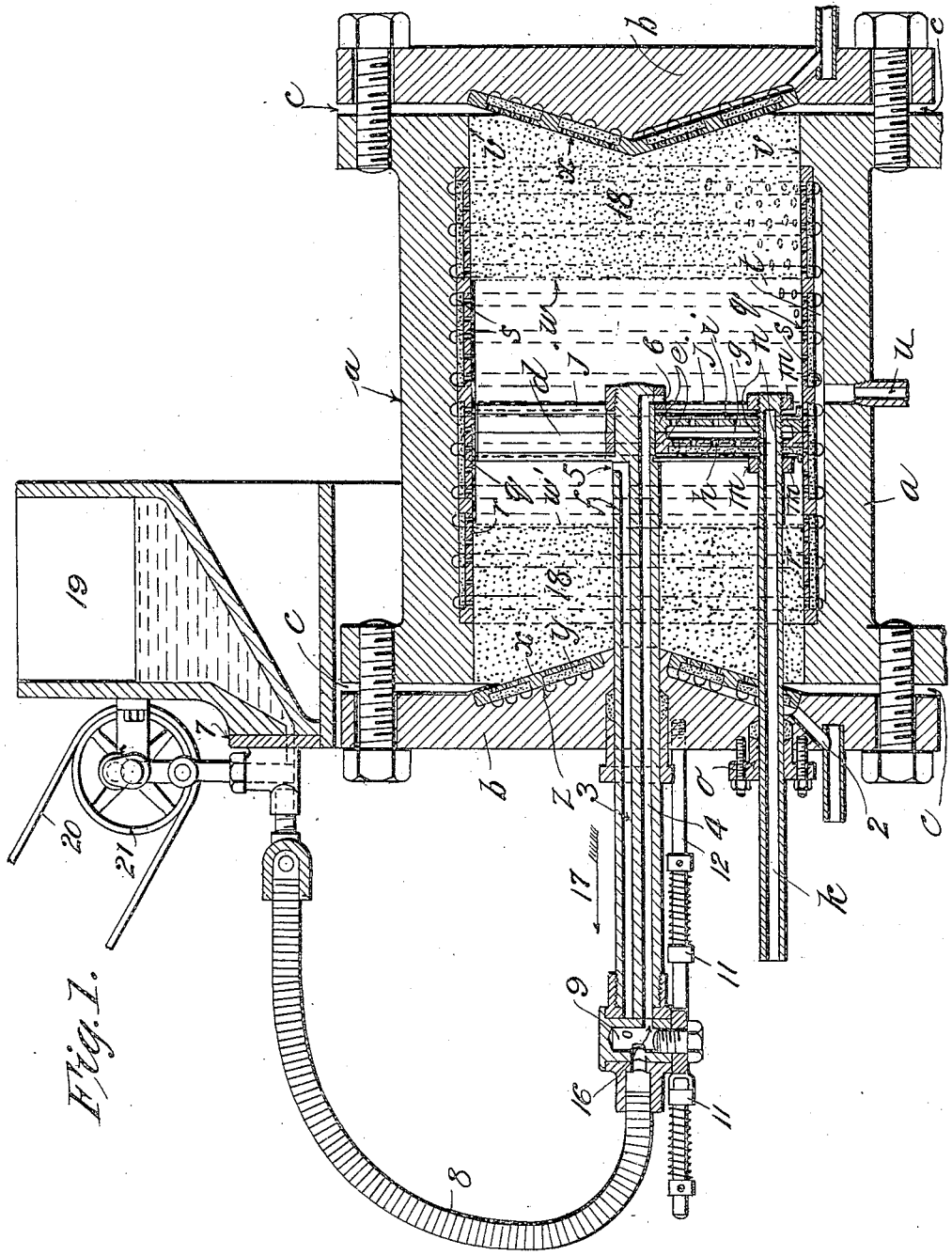

No. 838,841. PATENTED DEC. 18, 1906.
G. CARLSON.
CHOCOLATE PRESS.
APPLICATION FILED DEC. 26, 1905.

2 SHEETS—SHEET 1.

Witnesses:
H. L. Sprague
E. H. Scanlon

Inventor.
Gabriel Carlson
by Chapin & Co.
Attorneys.

No. 838,841. PATENTED DEC. 18, 1906.
G. CARLSON.
CHOCOLATE PRESS.
APPLICATION FILED DEC. 26, 1905.
2 SHEETS—SHEET 2.
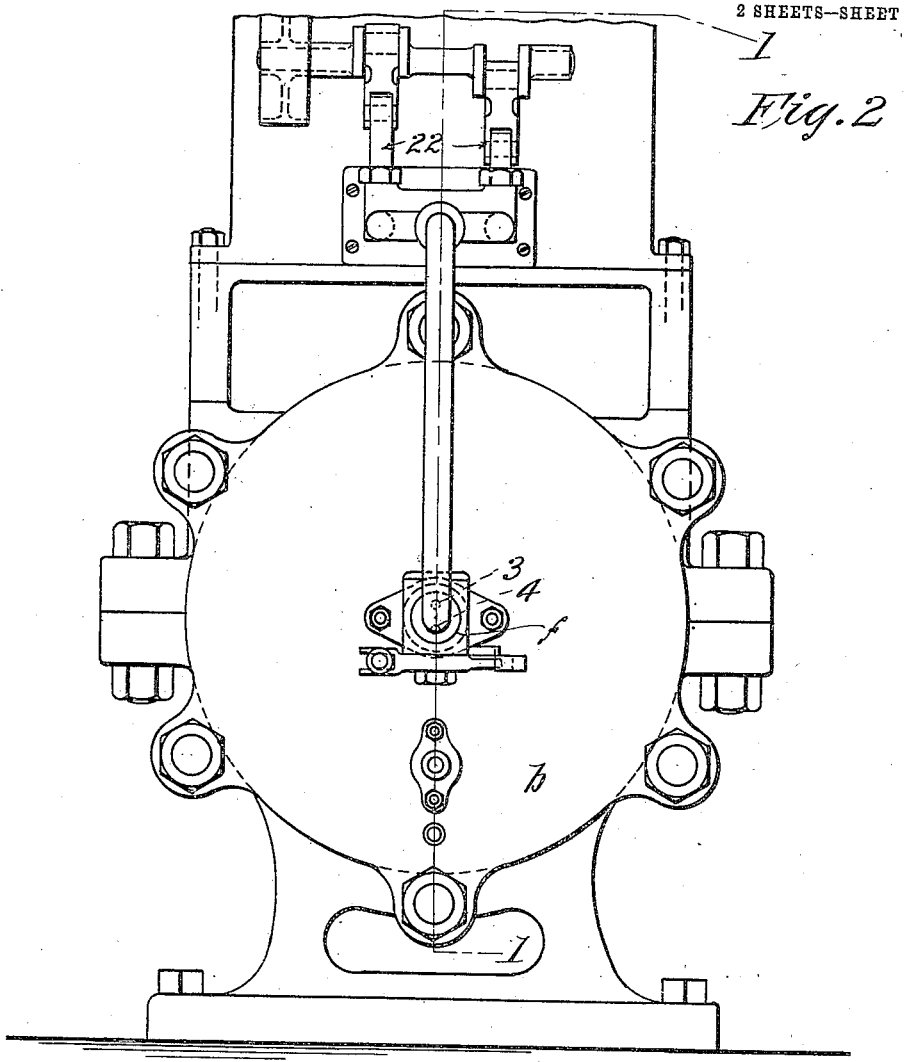
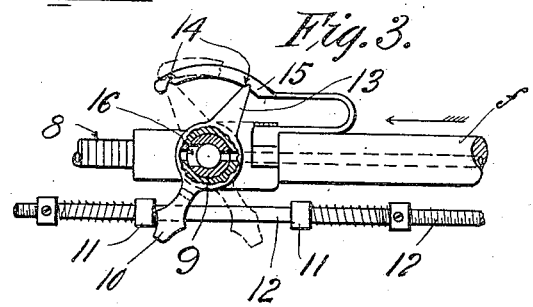
Witnesses:
H. L. Sprague
E. H. Seaholm
Inventor:
Gabriel Carlson
by Chapin & Co.
Attorneys

UNITED STATES PATENT OFFICE.

GABRIEL CARLSON, OF SPRINGFIELD, MASSACHUSETTS.

CHOCOLATE-PRESS.

No. 838,841.      Specification of Letters Patent.      Patented Dec. 18, 1906.

Application filed December 26, 1905. Serial No. 293,318.

*To all whom it may concern:*

Be it known that I, GABRIEL CARLSON, a citizen of the United States of America, residing at Springfield, in the county of Hampden and State of Massachusetts, have invented new and useful Improvements in Chocolate-Presses, of which the following is a specification.

This invention relates to the class of presses, and more particularly to that class of presses known as "chocolate-presses," and which broadly consists in employing a cylinder that has a restricted opening at the two ends thereof and having a piston or partition which slowly reciprocates for a short distance toward and from a point at equidistance from the opposite ends of the cylinder, whereby a cake of substantially dry material is formed at each end of the cylinder from which the moisture has been extracted or expressed by reason of the lateral and longitudinal pressure exerted on the pasty material against the interior walls of the cylinder, the lateral walls being transversely grooved and containing absorbent material, as felt, covered with a perforated lining of sheet-steel or other suitable material on which the piston moves; and, further, the invention broadly consists in employing the principle of the hydraulic press for the purpose of obtaining great pressure on the pasty mass for extracting the moisture therefrom, the pasty mass being forced by a continuously-operating pump to one side of the moving partition or piston while the confined material in the cylinder on the opposite side of the piston or partition to which the flow has been cut off is subjected to pressure by reason of the pump forcing the pasty material on the opposite side of the piston.

At a predetermined point in the travel of the piston the flow of pasty material is cut off from one side of the piston and allowed to enter the cylinder on the opposite side, thus driving the piston back and subjecting the pasty material, which has been forced into the cylinder to drive the piston forward during its first movement to great pressure on the return movement of the piston, as fully set forth below.

By employing an automatic valve which cuts off the flow of material from opposite sides of the piston at predetermined points in its travel a dry cake of the material, from which the moisture has been expressed, is collected at opposite ends of the piston adjacent the restricted openings, and substantially all of the pressure is exerted on the pasty material confined between the two vertical walls of the dry cake and the slowly-moving piston, whereby great lateral pressure is exerted on the side and end walls of the cylinder which have an absorbent material, and the moisture is thoroughly extracted therefrom. The moisture after being extracted is continuously carried away by a series of grooves or channels which are cut in the interior of the cylinder. Substantially the same construction is employed in the cylinder-heads for carrying away the moisture or water to the outside of the cylinder, and the invention further broadly consists in continuously forcing, by means of a pump or other suitable means, the pasty material through longitudinal passage-ways which are formed in the piston-rod, these passage-ways being so constructed that the inner ends thereof open on oppositely-disposed sides of the piston.

The flow of the pasty material through one or the other of the longitudinal passage-ways is automatically controlled by a rotary valve placed in the outer or free end of the piston-rod; and, further, the invention broadly consists in placing a perforated plate of sheet-steel or similar material on opposite sides of the piston and placing immediately below the sheet-steel a layer of felt or other absorbent material and perforating the two main parts of the piston-head or spiders and in forming a hollow interior in the piston or partition for the purpose of collecting the water or moisture which has been expressed and connecting with the piston a pipe which has communication with the interior of the piston-head at one end and passes through a stuffing-box in the end wall or cylinder-head at its other end, thereby permitting the expressed moisture or water to escape from the interior of the piston or partition.

Referring to the drawings forming part of this application, Figure 1 is a vertical longitudinal section through the machine on the line 1 1 of Fig. 2. Fig. 2 is an end elevation of Fig. 1 looking from the left, while Fig. 3 is a detailed sectional view of the rotary valve which controls the flow of the pasty material from the pump to the two passage-ways in the piston-rod.

The reference-letter *a* designates the barrel of the cylinder; *b*, the two cylinder-heads, that are securely bolted to the opposite ends of the cylinder by means of a threaded bolt, so that a restricted slit or passage-way c is formed.

d designates as a whole a piston or partition which is composed of two parts or castings e, that are secured to the inner ends of the piston-rod f. These castings e are so constructed that when placed in position on the piston-rod an interior opening g is formed in the interior of the piston-head. The castings e are perforated or contain a series of openings h.

Immediately over the castings e is placed a layer of felt i on both faces of the piston, and immediately over the layer of felt or other absorbent material is placed a perforated plate j, of steel or other suitable material, in order to prevent somewhat the pasty material from being forced into the meshes of the felt.

The parts of the piston or partition d are held together by a nut on the end of the piston-rod. In the lower part of the piston is secured an outlet-tube k, which passes entirely through the castings e of the piston and is locked in position by the two threaded nuts m. This outlet-tube has a series of openings n, which communicate with the interior of the piston for the purpose of carrying off the water or moisture expressed from the pasty material. The outer end of this outlet-tube k passes through a cylinder-head b and a stuffing-box, (designated by o.) This outlet-tube reciprocates or moves with the piston d.

The interior lateral wall of the cylinder has a perforated lining of sheet-steel or other suitable material, (designated by the reference-letter q.) Immediately back of this lining is placed a series of transverse strips of felt r, and immediately below these strips of felt are a series of transverse grooves or channels s on the interior of the cylinder for carrying away the expressed moisture. These transverse grooves or channels s all communicate with a longitudinal groove or channel t in the bottom of the cylinder a, and this in turn opens into an outlet tube or passage-way u. It will be noticed that the cylinder is so bored that the lining of sheet-steel does not extend its entire length and that the same is placed flush with the part v of the cylinder which does not receive a lining.

The cylinder-heads, it will be noticed, are slightly inclined or shelving on the inside and leading toward the opening c in order that the dry material may not stick to the cylinder-heads. The inner surfaces of the cylinder-heads are constructed in the same way as the interior of the cylinder—viz., by placing a perforated lining of sheet-steel x over the rings of felt y and the layers of felt being in turn placed over the grooves or channels z. These grooves or channels z all communicate with an outlet passage-way 2, placed in the lower part of the cylinder-heads b, as shown.

The piston-rod f has two longitudinal passage-ways 3 and 4, which extend the entire length of the rod, the upper one 3 communicating by an outlet 5 with the left-hand side of the piston and the lower one 4 communicating by an outlet 6 with the right-hand side of the piston. These passage-ways are for the purpose of conveying the semiliquid or pasty material which is continuously fed or forced by the pump 7 through the flexible tube 8 and are automatically controlled by a rotary valve 9.

Rigidly secured to the outer end of the rotary valve 9 is an arm 10, that is placed in line with the two spring-abutments 11, that are located on the fixed rod 12, as shown, the rod 12 being secured to the cylinder-head b. Rigidly secured to the arm 10 is an extension-piece 13, which has a pointed end and is adapted to engage two notches 14 in a spring-plate 15 and hold the valve locked in either one or the other position, according to whether the liquid material is to be forced through one or the other of the passage-ways 3 or 4.

The rotary valve 9 has an opening 16, which is always in communication with the flexible feed-tube 8, so that the supply of pasty material may never be cut off from either one side or the other of the piston d. When the piston is moving in the direction of the arrow 17, the pasty material is forced through the passage-way 4 to drive the piston toward the left, which subjects the material on the left side of the piston to great pressure, it being understood that in the preceding movements of the piston toward the right the pump has completely filled the space at the left-hand side of the piston with the pasty material from which the water or moisture is to be extracted; and when the piston reaches the point $w'$ the rotary valve 9 is snapped over into the other position, so that the pasty material is fed through the other passage-way 3 into the left-hand side of the piston. Thus the piston is slowly driven back toward the right to the point w, when the operation is reversed.

The outlet passage-ways c are so adjusted that the dry material only escapes very slowly, as the piston moves at a very slow rate, while the feeding-in pump operates at a comparatively higher rate. The pasty material is therefore put under great hydraulic compression in the direction of movement of the piston, forcing the same against the lateral and end walls of the cylinder, causing the moisture to be thoroughly extracted from the same, while at the same time dry cakes 18 of the material accumulate or are formed in the opposite end of the cylinder.

The hopper 19 of the pump 7 contains the semiliquid or pasty material of chocolate from which the moisture is to be extracted, and is forced through the flexible tube 8. The pump 7 is driven by any suitable motive power by means of a belt 20, which passes over the pulley 21. This pump is preferably a double-acting one, as shown in Fig. 2, by the two reciprocating pistons 22. The pump is continuous in its action, thereby keeping a constant supply of the pasty material in the cylinder under great pressure to drive the piston forward and thoroughly extract the moisture from the pasty mass.

A most important feature of my invention is embodied in the principle that the piston and dry cakes 18 form chambers into which the pasty material is forced by means of the pump 7. It is understood that the dry chocolate only escapes from the end of the cylinder toward which the piston is moving.

Having thus described my invention, what I claim, and desire to secure by Letters Patent of the United States, is—

1. In a continuous press, a cylinder, and a force-pump connected therewith to introduce into the cylinder, under pressure, the material from which moisture is to be extracted, there being near one end of the cylinder a suitable outlet-opening; a device in the cylinder to retard the movement of the material on one side of it and to force the material on the opposite side thereof through said opening, said movable device compressing the material ahead of it, and by retarding the movement of the material back of it effecting the compression of the latter by the pump-pressure.

2. In a continuous press, a cylinder and a continuously-operating pump connected therewith, and a movable device in the cylinder, the speed of movement of which will determine the degree of pump-pressure on the cylinder behind it, there being an outlet-opening in the end of the cylinder opposite the inlet, and means of communication through and around said movable device between the inlet and outlet openings.

3. In a device of the class described, a cylinder, one end of which has a restricted outlet, means for forcing pasty material into said cylinder, a slowly-moving device in the latter to retard the movement of the material in the cylinder, whereby pressure is exerted on the interior walls of the cylinder, conduits in the walls of the cylinder to carry off the expressed liquid.

4. In a device of the class described, a cylinder having conduits in the walls thereof, and a restricted opening at its end, means for forcing pasty material into the cylinder, and a slowly-moving device for preventing the normal flow of the pasty material through the cylinder whereby pressure is created on the interior walls of the cylinder, and the moisture from the pasty material is extracted therefrom.

5. In a press of the class described, a cylinder having conduits in the walls thereof and restricted openings at its ends, a reciprocating wall or partition movable within said cylinder, means for forcing the pasty material into the cylinder whereby internal pressure is created in the cylinder, and a substantially dry cake from which the moisture has been abstracted is formed at the ends of the cylinder, and the pasty material is accumulated between the dry cake and the slowly-moving wall or partition.

6. In a press of the class described, a cylinder having restricted openings at its ends, a series of grooves or channels in the side walls of the cylinder, a series of moisture-absorbing strips in said grooves or channels, a reciprocating wall or partition having a limited movement within the cylinder, means for forcing pasty material into the cylinder under pressure, said material being forced into the cylinder at a greater speed than it escapes from the ends of the cylinder whereby internal pressure is created in the cylinder to force the extracted liquid through said strips.

7. In a press of the class described, a cylinder having restricted openings at its ends, a series of grooves on the interior walls of said cylinder, porous material in said grooves and a perforated metallic lining of said porous material and a movable piston or partition within said cylinder, means for forcing pasty material into the cylinder on opposite sides of the piston or partition whereby the moisture is alternately abstracted from the material on one side of the piston by pump-pressure and on the opposite side by the movement of the piston actuated by the pump-pressure.

8. In a device of the class described, a cylinder having restricted openings at its ends, a piston having a chambered head to receive liquid expressed from the material and communicating with the atmosphere through a conduit extending through the end of the cylinder, means for forcing pasty material into said cylinder, a piston-rod for said piston having separate longitudinal passage-ways opening on either side of the piston, and means for automatically controlling the flow of pasty material from said forcing means alternately through the passages in the piston-rod.

9. In a press of the class described, a cylinder having restricted openings at its ends, the interior wall of the cylinder-head having a series of grooves or channels, absorbent material in said grooves or channels, and a covering or lining of perforated material over said absorbent material, a slowly-moving piston or partition having a limited movement within said cylinder, a piston-rod having separate longitudinal passage-ways therethrough communicating with opposite sides of the piston, means for forcing the pasty material through said passage-ways into the space in the cylinder comprised between the slowly-moving wall or partition and the cylinder-head whereby the moisture is abstracted from the pasty material and the material is put under great lateral pressure by the means for forcing the pasty material into the confined space.

10. In a press of the class described, a cylinder having restricted openings at its ends, a perforated metallic lining for said cylinder and communicating with a series of grooves in the interior of the cylinder, a piston having a limited movement within the cylinder, a piston-rod having two longitudinal passage-ways opening on opposite sides of the piston, means to force pasty material into the cylinder, a conduit extending from the piston-rod to said forcing means, and a valve in said conduit, the piston serving to prevent the free inflow of material from the forcing means whereby pressure is exerted on the pasty material within the cylinder, and a dry or cake-like portion of the pasty material is formed at opposite ends of the cylinder, and means for conveying the moisture away from the interior of the cylinder.

11. In a press, a cylinder, a piston and piston-rod therefor, a pump to force material into the cylinder, said piston-rod having separate passages therethrough communicating respectively with opposite sides of the piston, a tubular connection extending from the pump to the piston-rod, a valve in said connection controlling the passage-way from the pump to the opposite sides of the piston, there being outlets at opposite ends of the cylinder, the area of which determines the speed of movement of the piston.

GABRIEL CARLSON.

Witnesses:
 WM. H. CHAPIN,
 H. W. BOWEN.